(12) United States Patent
Biskeborn et al.

(10) Patent No.: US 11,532,330 B1
(45) Date of Patent: Dec. 20, 2022

(54) DATA STORAGE DEVICE COMPENSATING FOR MAGNETIC TAPE DISTORTION WHEN SHINGLE WRITING DATA TRACKS

(71) Applicant: Western Digital Technologies, Inc., San Jose, CA (US)

(72) Inventors: Robert G. Biskeborn, Hollister, CA (US); Trevor W. Olson, San Jose, CA (US); Mark L. Watson, Boulder, CO (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/471,028

(22) Filed: Sep. 9, 2021

(51) Int. Cl.
*G11B 20/22* (2006.01)
*G11B 5/008* (2006.01)

(52) U.S. Cl.
CPC .......... *G11B 20/22* (2013.01); *G11B 5/00813* (2013.01)

(58) Field of Classification Search
None
See application file for complete search history.

(56) References Cited

U.S. PATENT DOCUMENTS

| | | | | |
|---|---|---|---|---|
| 3,508,231 A * | 4/1970 | Levin | ..................... | G11B 20/20 360/134 |
| 4,342,057 A * | 7/1982 | LaBeau | .................. | G11B 20/20 |
| 5,828,514 A * | 10/1998 | Chliwnyj | ............... | G11B 33/10 |
| 6,687,070 B1 * | 2/2004 | Peterson | ............ | G11B 5/00817 |
| 7,982,994 B1 * | 7/2011 | Erden | ...................... | G11B 5/02 360/55 |
| 8,797,682 B1 * | 8/2014 | Biskeborn | .......... | G11B 5/00826 360/121 |
| 9,508,370 B1 * | 11/2016 | Zhu | ..................... | G11B 5/59627 |
| 9,607,633 B1 * | 3/2017 | Toribio | ................ | G11B 20/182 |
| 10,607,645 B1 * | 3/2020 | Hamaguchi | .......... | G11B 5/5552 |
| 11,295,772 B1 * | 4/2022 | Watson | ............. | G11B 5/00813 |
| 2002/0085304 A1 * | 7/2002 | Wang | ..................... | G11B 5/584 |
| 2002/0163752 A1 * | 11/2002 | Peterson | ................ | G11B 5/584 |
| 2012/0176698 A1 * | 7/2012 | Rub | .................... | G11B 20/1833 |
| 2013/0083419 A1 * | 4/2013 | Springberg | .............. | G11B 5/09 |
| 2013/0335856 A1 * | 12/2013 | Tanabe | ................... | G11B 5/012 360/76 |
| 2014/0198403 A1 * | 7/2014 | Biskeborn | .......... | G11B 5/00891 360/48 |
| 2016/0307595 A1 * | 10/2016 | Gao | .................... | G11B 20/1833 |
| 2018/0182432 A1 * | 6/2018 | Liu | .................... | G11B 5/59633 |

* cited by examiner

*Primary Examiner* — Peter Vincent Agustin
(74) *Attorney, Agent, or Firm* — Patterson & Sheridan, LLP; Steven H. VerSteeg

(57) ABSTRACT

The disclosed embodiments generally relate to a data storage device for accessing a magnetic tape. The device includes write heads writing data tracks on the magnetic tape and control circuitry configured to: (1) use the heads to write a first set of data tracks on the magnetic tape; (2) measure a distortion of the first set of data tracks after the first set of data tracks have been written; and (3) use the heads to shingle write a second set of data tracks relative to the first set of data tracks based on the measured distortion. To compensate for the distortion, a priority servo is chosen based on whether the distortion is an expansion or contraction, and/or whether the shingle writing direction is inbound or outbound. The head bar is moved during shingle writing toward the servo track associated with the priority servo.

20 Claims, 11 Drawing Sheets

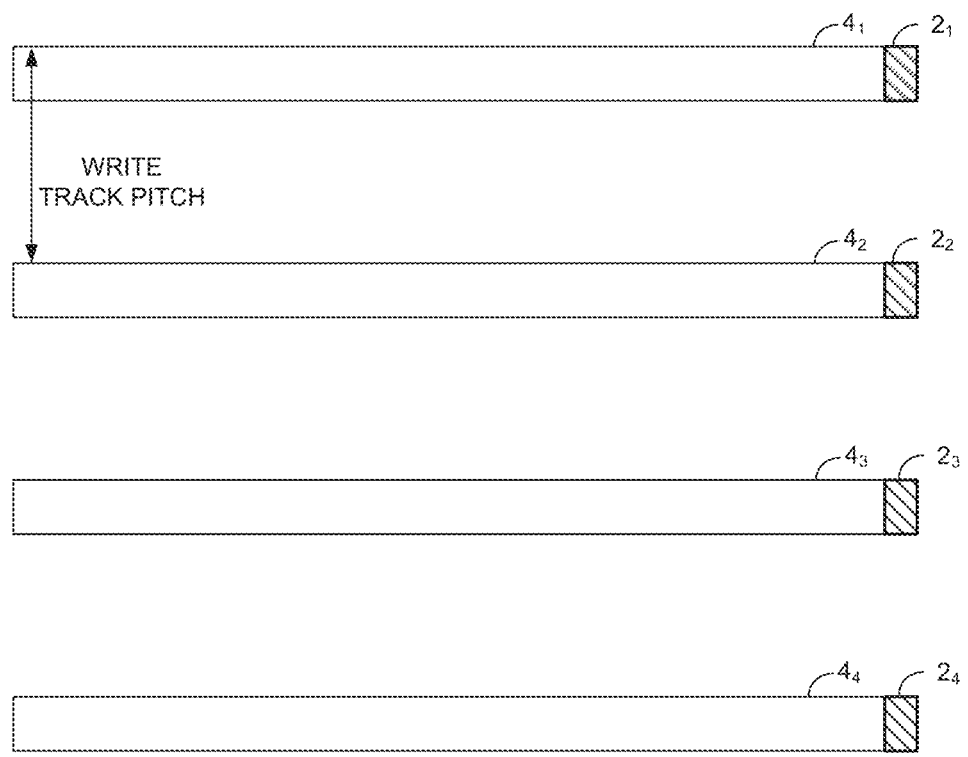
FIG. 4A
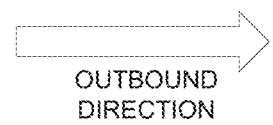

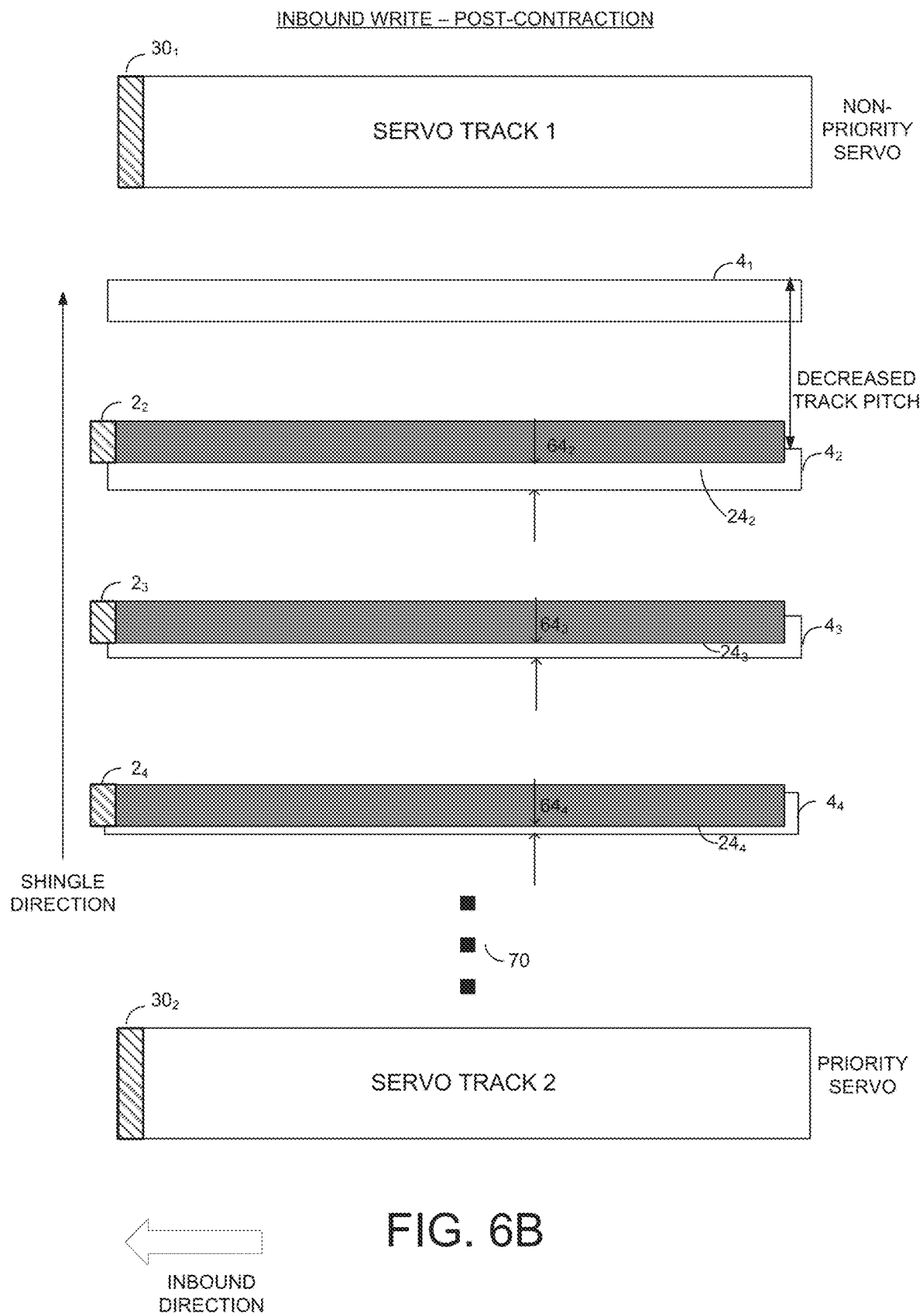

DATA STORAGE DEVICE COMPENSATING FOR MAGNETIC TAPE DISTORTION WHEN SHINGLE WRITING DATA TRACKS

BACKGROUND OF THE DISCLOSURE

Conventional tape drive storage systems comprise a magnetic tape wound around a dual reel (reel-to-reel cartridge) or a single reel (endless tape cartridge), wherein the reel(s) are rotated in order to move the magnetic tape over one or more transducer heads during write/read operations. The format of the magnetic tape may be single track or multiple tracks that are defined linearly, diagonally, or arcuate with respect to the longitudinal dimension along the length of the tape. With a linear track format, the heads may remain stationary relative to the longitudinal dimension of the tape, but may be actuated in a lateral dimension across the width of the tape as the tape moves past the heads. With a diagonal or arcuate track format, the heads may be mounted on a rotating drum such that during access operations both the heads and tape are moved relative to one another (typically in opposite directions along the longitudinal dimension of the tape).

BRIEF DESCRIPTION OF THE DRAWINGS

FIGS. 4A-4B show how tape contraction is compensated in an outbound shingling write case, in one embodiment.

FIGS. 6A-6B show how tape contraction is compensated in an inbound shingling write case, in one embodiment.

DETAILED DESCRIPTION

Figure 1A:
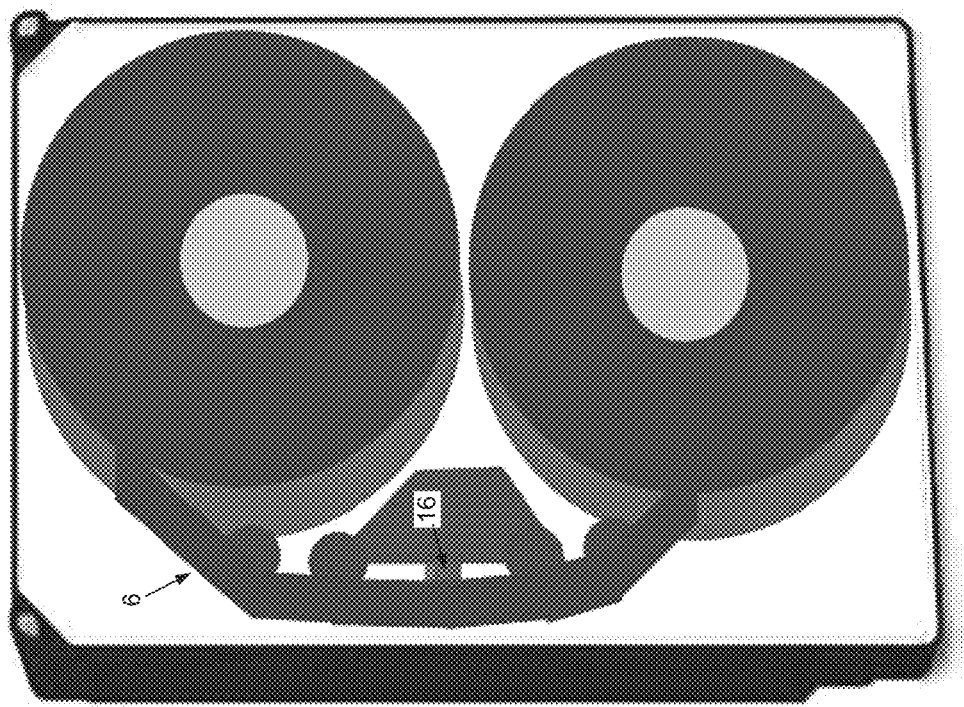
FIG. 1A shows a data storage device according to an embodiment comprising a head bar configured to access a magnetic tape.
Figure 1C:
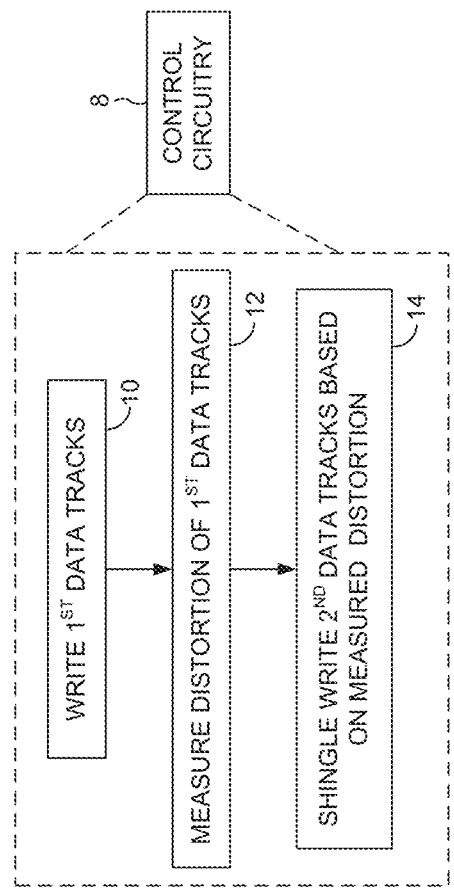
FIG. 1C is a flow diagram according to an embodiment wherein a data tracks are shingle written in a manner that compensates for a distortion of the magnetic tape.
Figure 1B:
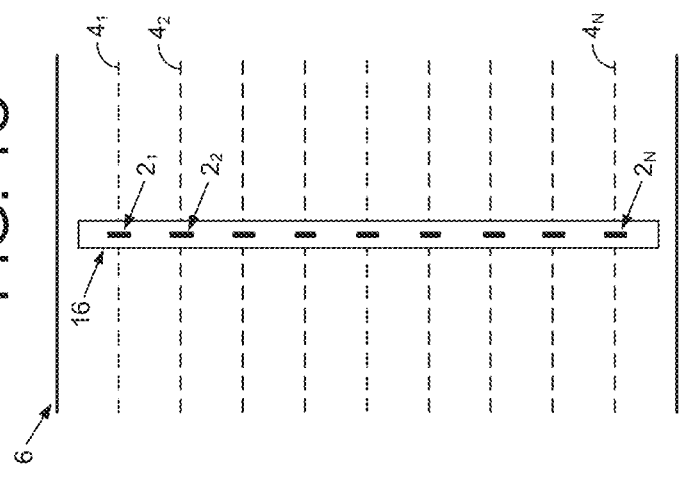
FIG. 1B shows an embodiment wherein the data storage device comprises a head bar comprising a plurality of heads.

FIGS. 1A and 1B show a data storage device according to an embodiment comprising a plurality of heads $2_1$-$2_N$ configured to concurrently write a plurality of data tracks $4_1$-$4_N$ on a magnetic tape 6. The data storage device further comprises control circuitry 8 configured to execute the flow diagram of FIG. 1C, wherein the heads are used to write a first plurality of data tracks on the magnetic tape (block 10). A distortion of the first plurality of data tracks is measured (block 12), and the heads are used to shingle write a second plurality of data tracks relative to the first plurality of data tracks based on the measured distortion (block 14).

Figure 1D:
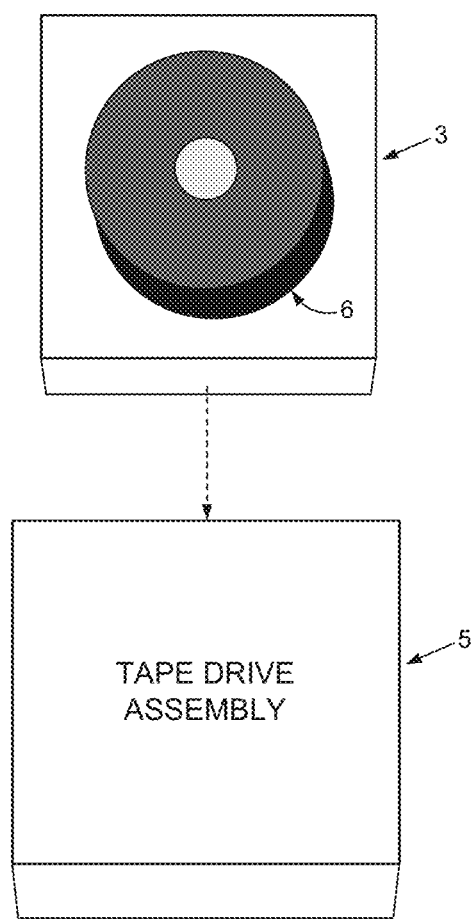
FIG. 1D shows an embodiment wherein the data storage device comprises a tape drive assembly configured to access a magnetic tape housed in a cartridge assembly.

In the embodiment of FIG. 1A, the data storage device comprises an embedded magnetic tape 6 installed into a tape drive assembly which, in one embodiment, may be the same form factor as a conventional disk drive. In another embodiment shown in FIG. 1D, the magnetic tape 6 may be housed in a cartridge assembly 3 that is inserted into (and ejected from) a tape drive assembly 5 similar to a conventional tape drive manufactured under the Linear Tape-Open (LTO) standard. In one embodiment, the tape drive assembly 5 comprises the head 2 configured to access the magnetic tape 6, and the control circuitry configured to execute the flow diagram of FIG. 1C. In the embodiment of FIG. 1D, the magnetic tape 6 is wound around a single reel which may also be employed in the embodiment of FIG. 1A.

In the embodiment of FIG. 1B, the data storage device comprises a head bar 16 comprising a plurality of heads $2_1$-$2_N$ configured to access a plurality of respective data tracks $4_1$-$4_N$. In one embodiment, the data tracks may be shingle written meaning that a previously written data track is partially overwritten by a newly written data track.

Figure 2A:
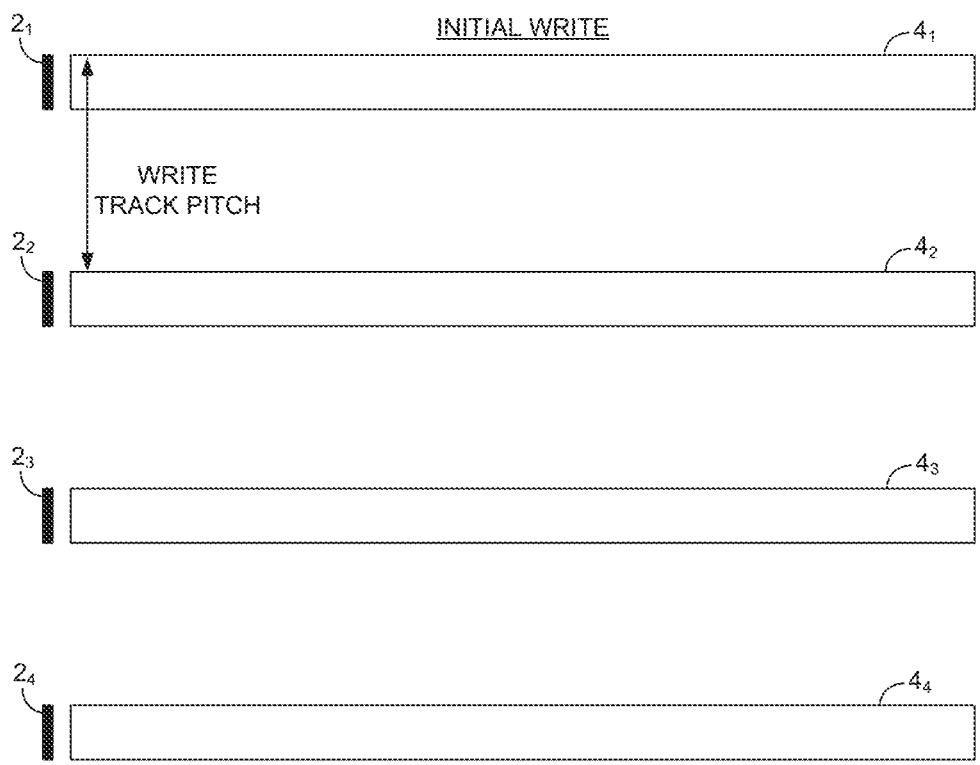
FIG. 2A shows an embodiment wherein a first plurality of data tracks are written at a first track pitch.
Figure 2B:
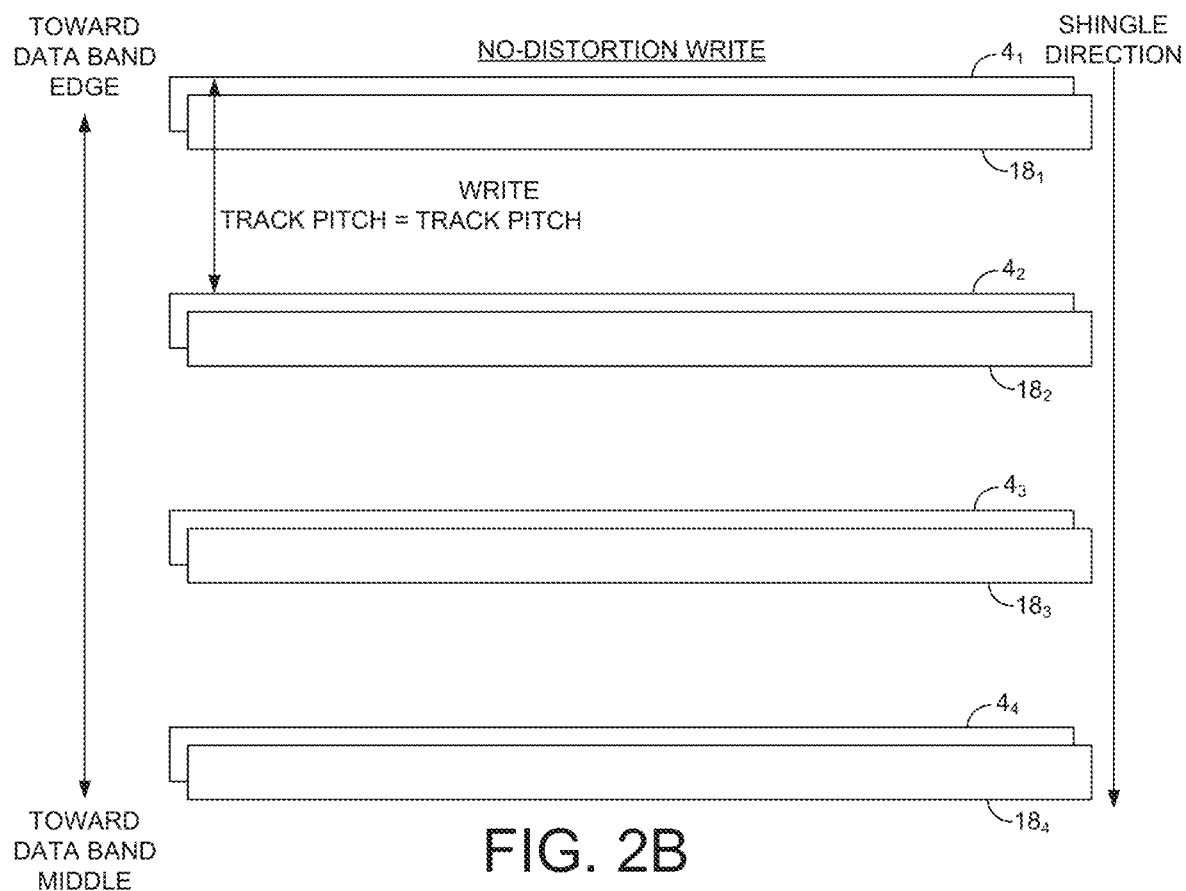
FIG. 2B shows shingle writing a second plurality of data tracks relative to the first plurality of data tracks when the first track pitch has not changed (no distortion of the magnetic tape) according to an embodiment.

FIG. 2A shows a simplified example wherein the head bar of FIG. 1B comprises four heads for concurrently writing four data tracks. In this example, a first set of data tracks $4_1$-$4_4$ are written using heads $2_1$-$2_4$ at the beginning of a group of tracks, sometimes called a data band, where the width of each data track $4_1$-$4_4$ corresponds to the width of the corresponding rectangle in FIG. 2A. The write track pitch (distance between the data tracks) is defined by the distortion state of the magnetic tape 6 at the time of the write as well as the lateral distance between the heads $2_1$-$2_4$ (which is fixed). FIG. 2B shows an example wherein a second set of data tracks $18_1$-$18_4$ are shingle written by offsetting the head bar 16 in the lateral direction. In this example, the state of the magnetic tape 6 has not changed such that the track pitch of the data tracks $18_1$-$18_4$ is the same as the write track pitch of the previously written data tracks $4_1$-$4_4$. That is in this example, there is no need to compensate for a distortion of the magnetic tape 6 since no distortion occurred between writing data tracks $4_1$-$4_4$ and writing data tracks $18_1$-$18_4$.

Outbound Shingling Writes—Tape Expansion Case

Figure 3A:
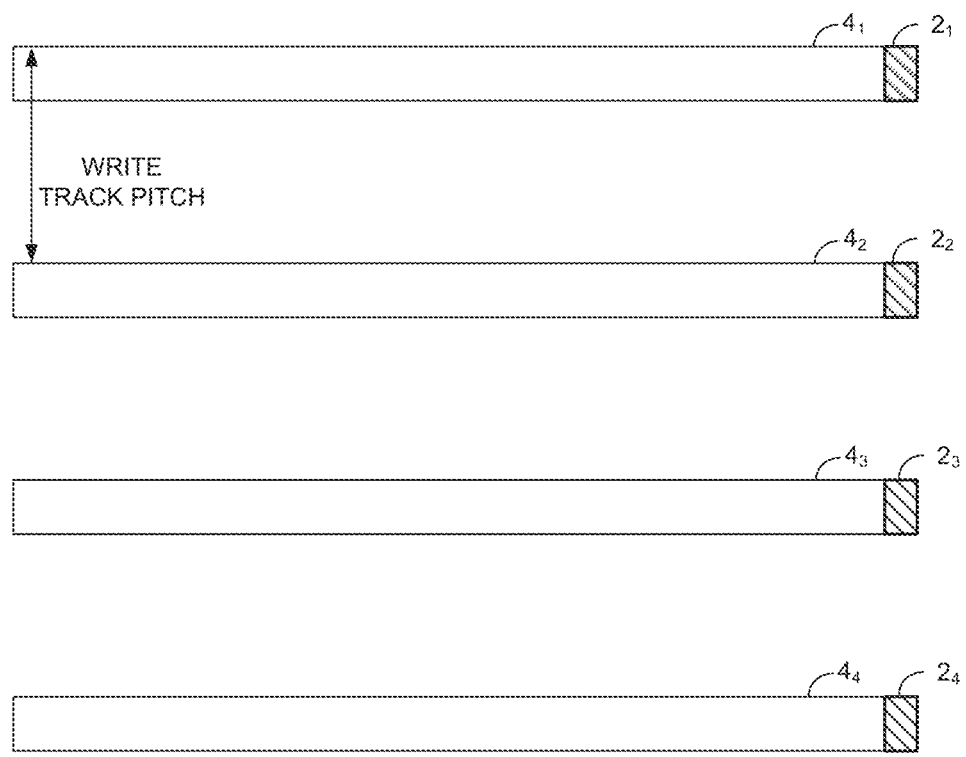
FIGS. 3A-3B show how tape expansion is compensated in an outbound shingling write case, in one embodiment.
Figure 3A:
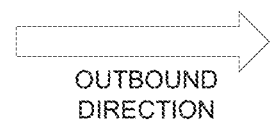
Figure 3B:
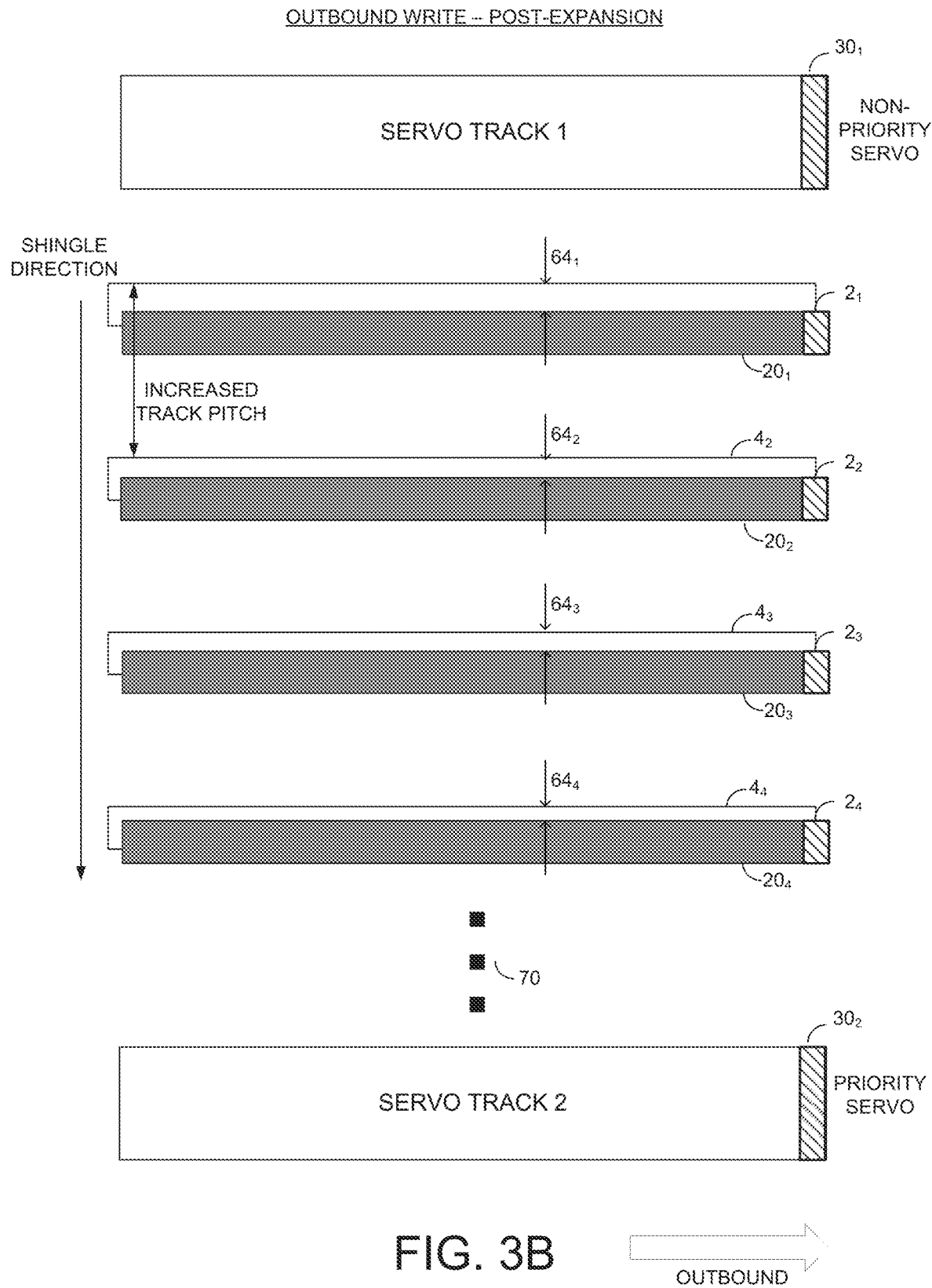

FIGS. 3A-3B show how tape expansion is compensated in an outbound shingling write case, in one embodiment. FIG. 3A shows an example wherein a first set of data tracks $4_1$-$4_4$ are written using the respective heads $2_1$-$2_4$ at the beginning of a data band wherein the write track pitch (distance between the data tracks) is defined by the distortion state of the magnetic tape 6 at the time of the write. FIG. 3B shows outbound shingled writes in a serpentine shingle write scheme, at a later point in time. In this case, the "outbound" direction is to the right of the figure, as the tape is being written from left to right toward the outbound direction (both sets of example tracks $4_{1-4}$ and $20_{1-4}$). Alternatively, this can just be the chosen direction used if unidirectional shingling is implemented. In the FIG. 3B example, after writing data tracks $4_1$-$4_4$, the magnetic tape 6 expands (e.g., due to a change in humidity, and/or tape creep) causing the track pitch of the data tracks $4_1$-$4_4$ to increase as compared to the write track pitch when the data tracks $4_1$-$4_4$ were written (FIG. 3A).

In one embodiment, the distortion (expansion in this example) is determined and the determined distortion is used to shingle write a next set of data tracks $20_1$-$20_4$ in order to compensate for the distortion. One method of determining distortion involves periodically recording positioning information as writing occurs. The recorded position can be made for every N mm down the length of the tape, and N can be for example 10, 100, 1000, or other value. For example, a data header for a data set written can be used to record the measured position at time of writing. Then, later when shingled writing occurs, the recorded position information can be read back and compared to the positioning information extracted from the servo channel, which is based on processing a combination of signals from the two servo tracks that define the band of data on the tape. For example, it can leverage the tape position marking information embedded in the L-POS information. In summary, the recorded position information at time of writing can be compared to the servo information when the next shingled write occurs, to determine whether any distortion has occurred.

The compensation scheme in one embodiment involves designating a priority servo from the servo heads over the two servo tracks ($30_1/30_2$). It is noted that shingled written tracks are shown in this example to be close to servo track 1, and ellipses 70 indicate that there are additional tracks not shown, and to also illustrate that the servo track 2 is farther away from the 4 sets of example shingled tracks than servo track 1. The servo prioritization involves using the signal of the priority servo head 302 for determining the position of the write heads $2_1$, $2_2$, $2_3$ and $2_4$. In some implementations, the signals of the two servo heads can still be used for servo signal acquisition or synchronization, but the priority servo signal would be used for determining the position of the write heads in response to the detected expansion. In the scenario shown in FIG. 3B, the head bar is moved toward the priority servo head (for servo track 2). As a result, in FIG. 3B data track $20_1$, $20_2$, $20_3$, and $20_4$ may be written with an increasing shingle overlap in the shingling direction as shown in FIG. 3B. Stated another way, the amount of non-overlap area ($64_1$-$64_4$) would decrease by corresponding amounts in the shingling direction, which is also the direction toward the priority servo (servo track 2). Physically, since the lateral distance between the heads $2_1$-$2_4$ is fixed, when the magnetic tape 6 expands, the track pitch of data tracks $20_1$-$20_4$ will be smaller compared to the increased track pitch of data tracks $4_1$-$4_4$.

Outbound Shingling Writes—Tape Contraction Case

Figure 4B:
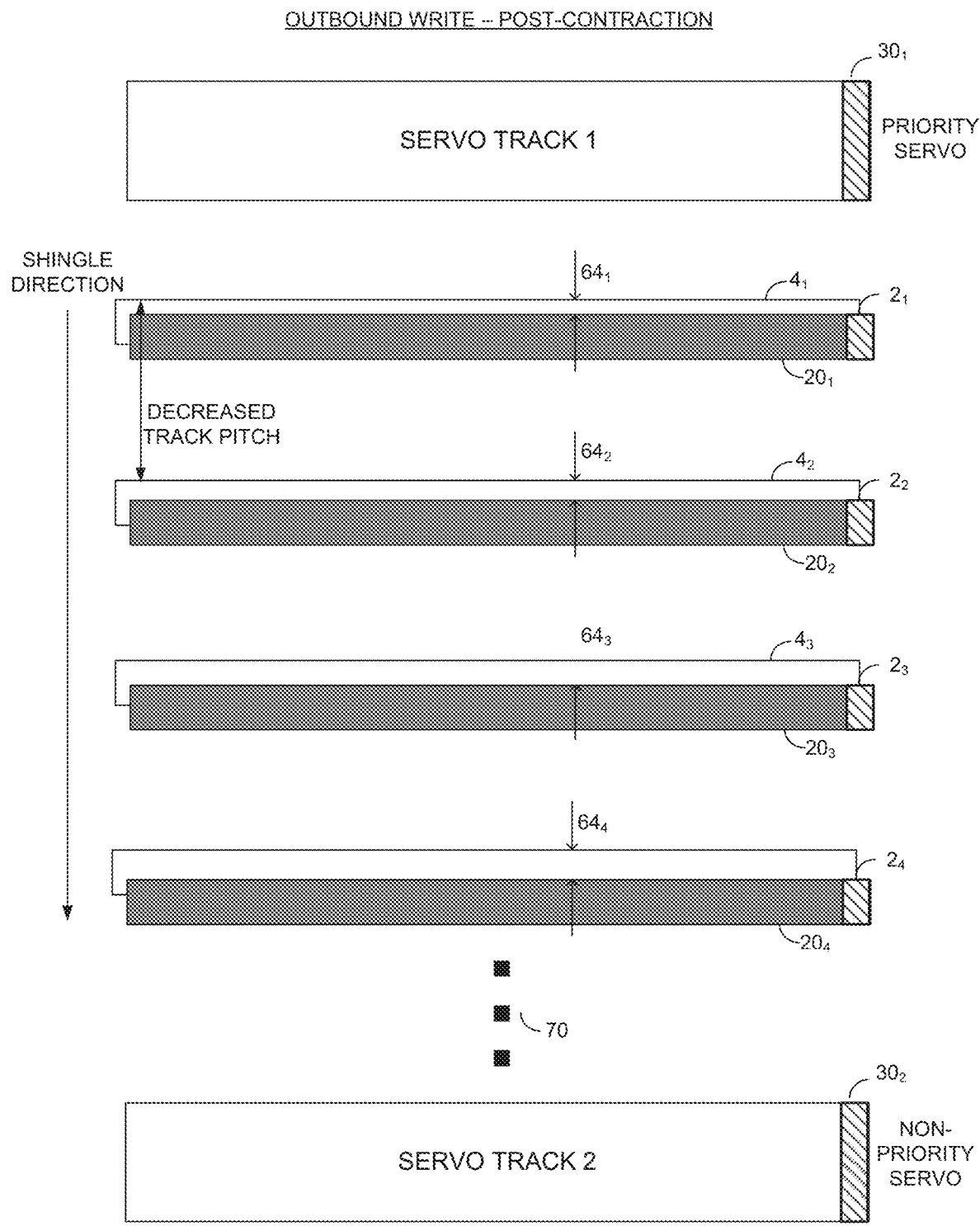

FIGS. 4A-4B show how tape contraction is compensated in an outbound shingling write case, in one embodiment. FIG. 4A shows an example wherein a first set of data tracks $4_1$-$4_4$ are written using the respective heads $2_1$-$2_4$ at the beginning of a data band wherein the write track pitch (distance between the data tracks) is defined by the distortion state of the magnetic tape 6 at the time of the write. FIG. 4B shows outbound shingled writes in a serpentine shingle write scheme, at a later point in time. Same as FIG. 3B, the "outbound" direction is to the right of the figure, as the tape is being written from left to right toward the outbound direction (both sets of example tracks $4_{1-4}$ and $20_{1-4}$). Alternatively, this can just be the chosen direction used if unidirectional shingling is implemented. In the FIG. 4B example, after writing data tracks $4_1$-$4_4$ the magnetic tape 6 contracts (e.g., due to a change in humidity, and/or tape creep) causing the track pitch of the data tracks $4_1$-$4_4$ to decrease as compared to the write track pitch when the data tracks $4_1$-$4_4$ were written (FIG. 4A).

In one embodiment, the distortion (contraction in this example) is determined as discussed above, and the determined distortion is used to shingle write a next set of data tracks $22_1$-$22_4$ in order to compensate for the distortion. As discussed above, the compensation scheme in one embodiment involves designating a priority servo from the servo heads over the two servo tracks ($30_1/30_2$). It is noted that shingled written tracks are shown in this example to be close to servo track 1, and ellipses 70 indicate that there are additional tracks not shown, and to also illustrate that the servo track 2 is farther away from the 4 sets of example shingled tracks than servo track 1. The servo prioritization involves using the signal of the priority servo head 301 for determining the position of the write heads $2_1$, $2_2$, $2_3$ and $2_4$. In the scenario shown in FIG. 4B, the head bar is are moved toward the priority servo head (for servo track 1). As a result, in FIG. 4B data track $22_1$, $22_2$, $22_3$, and $22_4$ may be written with a decreasing shingle overlap in the shingling direction as shown in FIG. 4B. Stated another way, the amount of non-overlap area ($64_1$-$64_4$) would increase by corresponding amounts in the shingling direction, which is also the direction away from the priority servo (servo track 1). Physically, since the lateral distance between the heads $2_1$-$2_4$ is fixed, when the magnetic tape 6 contracts the track pitch of data tracks $20_1$-$20_4$ will be larger compared to the decreased track pitch of data tracks $4_1$-$4_4$.

Inbound Shingling Writes—Tape Expansion Case

Figure 5A:
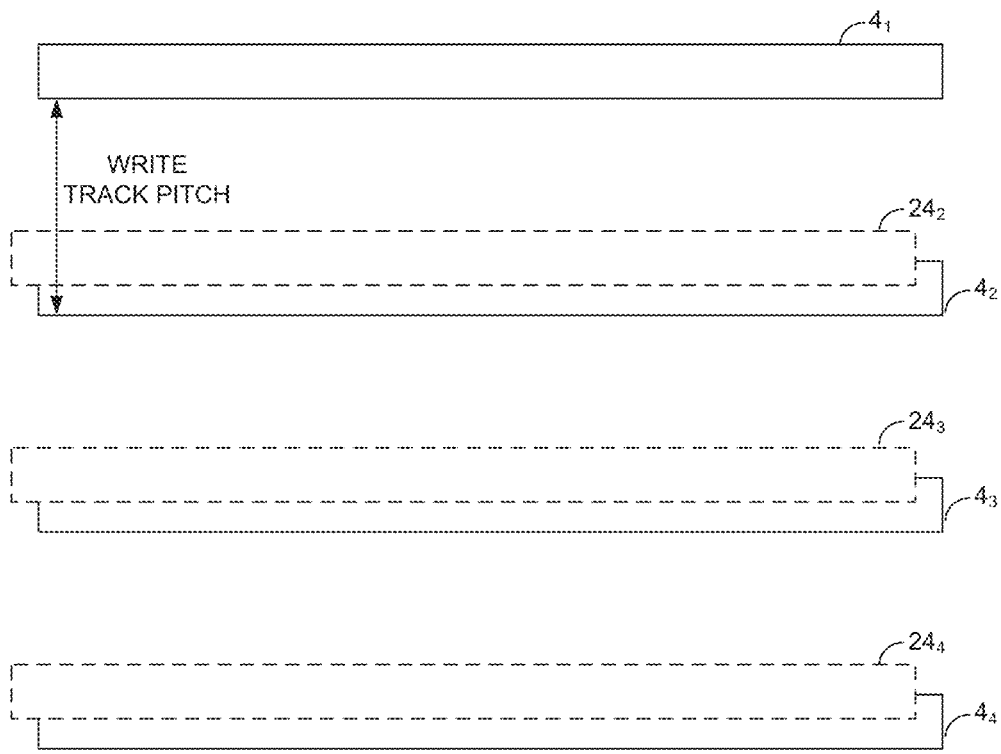
FIGS. 5A-5B show how tape expansion is compensated in an inbound shingling write case, in one embodiment.
Figure 5A:
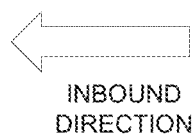
Figure 5B:
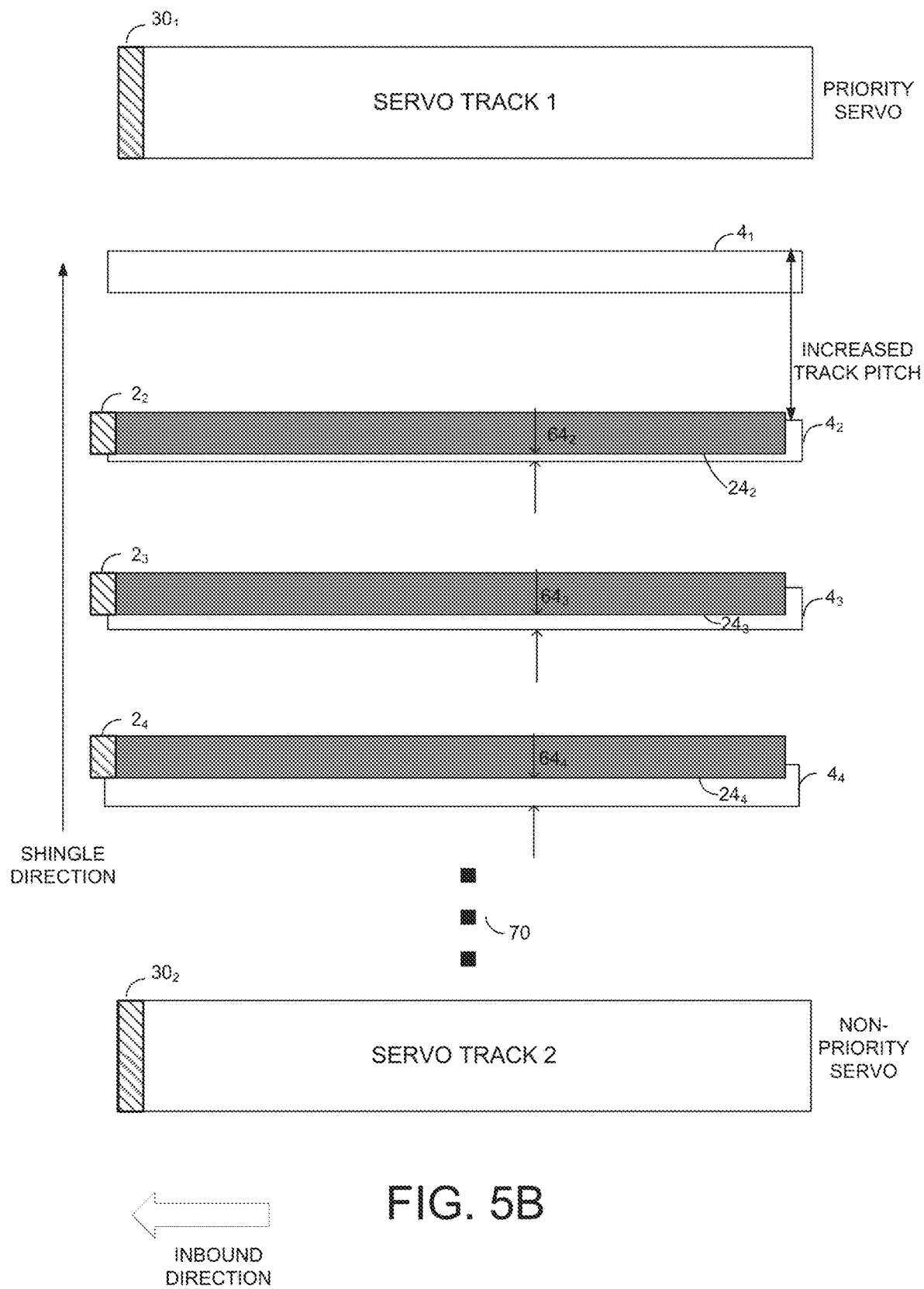

FIGS. 5A-5B show how tape expansion is compensated in an inbound shingling write case, in one embodiment. FIG. 5A shows an example wherein a first set of data tracks $4_1$-$4_4$ are written at the beginning of a data band wherein the write track pitch (distance between the data tracks) is defined by the distortion state of the magnetic tape 6 at the time of the write. Also shown in dotted line boxes are shingled tracks $24_2$-$24_4$ to be written inbound in a serpentine shingle write scheme, at a later point in time. Here, the "inbound" direction is to the left of the figure, as the tape is being written from right to left toward the inbound direction. Alternatively, this can just be the chosen direction used if unidirectional shingling is implemented. In the FIG. 5B example, after writing data tracks $4_1$-$4_4$ the magnetic tape 6 expands (e.g., due to a change in humidity, and/or tape creep) causing the track pitch of the data tracks $4_1$-$4_4$ to increase as compared to the write track pitch when the data tracks $4_1$-$4_4$ were written (FIG. 5A). Similar to the embodiments above, the distortion (expansion in this example) is determined and the determined distortion is used to shingle write a next set of data tracks $24_2$-$24_4$ in order to compensate for the distortion. As discussed above, the compensation scheme in one embodiment involves designating a priority servo from the servo heads over the two servo tracks ($30_1/30_2$). It is noted that shingled written tracks are shown in this example to be close to servo track 1, and ellipses 70 indicate that there are additional tracks not shown, and to also illustrate that the servo track 2 is farther away from the 4 sets of example shingled tracks than servo track 1. The servo prioritization involves using the signal of the priority servo head $30_1$ for determining the position the write heads $2_2$, $2_3$ and $2_4$. In the scenario shown in FIG. 5B, the head bar is moved toward the priority servo head (for servo track 1). As a result, in FIG. 5B data tracks $24_2$, $24_3$, and $24_4$ may be written with an increasing shingle overlap in the direction of the shingling as shown in FIG. 5B. Stated another way, the amount of non-overlap area ($64_2$-$64_4$) would decrease by corresponding amounts in the shingling direction, which is also the direction toward the priority servo (servo track 1). Physically, since the lateral distance between the heads $2_1$-$2_4$ is fixed, when the magnetic tape 6 expands the track pitch of data tracks $24_2$-$24_4$ will be smaller compared to the increased track pitch of data tracks $4_1$-$4_4$.

Inbound Shingling Writes—Tape Contraction Case

Figure 6A:
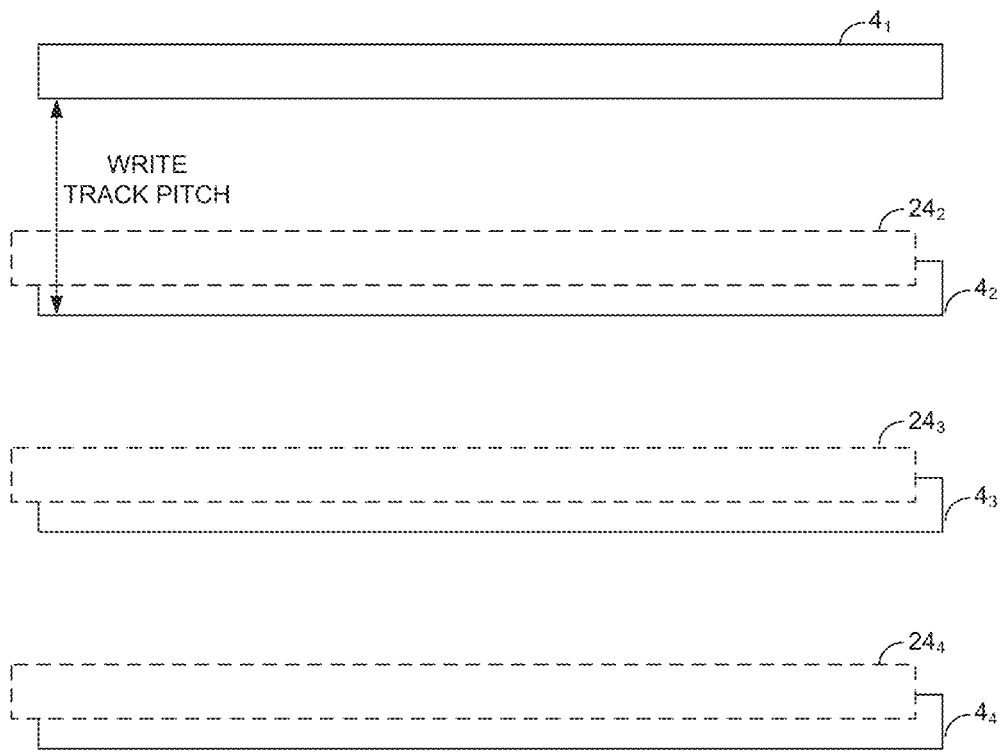
Figure 6A:
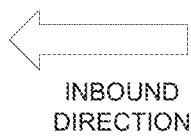

FIGS. 6A-6B show how tape contraction is compensated in an inbound shingling write case, in one embodiment. FIG. 6A shows an example wherein a first set of data tracks $4_1$-$4_4$ are written at the beginning of a data band wherein the write track pitch (distance between the data tracks) is defined by the distortion state of the magnetic tape 6 at the time of the write. Also shown in dotted line boxes are shingled tracks $24_2$-$24_4$ to be written inbound in a serpentine shingle write scheme, at a later point in time. Same as FIG. 5B, the "inbound" direction is to the left of the figure, as the tape is being written from right to left toward the inbound direction. Alternatively, this can just be the chosen direction used if unidirectional shingling is implemented. In the FIG. 6B example, after writing data tracks $4_1$-$4_4$ the magnetic tape 6 contracts (e.g., due to a change in humidity, and/or tape creep) causing the track pitch of the data tracks $4_1$-$4_4$ to decrease as compared to the write track pitch when the data tracks $4_1$-$4_4$ were written (FIG. 6A). Similar to the embodiments above, the distortion (contraction in this example) is determined and the determined distortion is used to shingle write a next set of data tracks $24_2$-$24_4$ in order to compensate for the distortion. As discussed above, the compensation scheme in one embodiment involves designating a priority servo from the servo heads over the two servo tracks ($30_1$/$30_2$). It is noted that shingled written tracks are shown in this example to be close to servo track 1, and ellipses 70 indicate that there are additional tracks not shown, and to also illustrate that the servo track 2 is farther away from the 4 sets of example shingled tracks than servo track 1. The servo prioritization involves using the signal of the priority servo head 302 for determining the position of the write heads $2_2$, $2_3$ and $2_4$. In the scenario shown in FIG. 5B, the head bar is moved toward the priority servo head (for servo track 2). As a result, in FIG. 6B data tracks $24_2$, $24_3$, and $24_4$ may be written with a decreasing shingle overlap in the shingling direction as shown in FIG. 6B. Stated another way, the amount of non-overlap area ($64_2$-$64_4$) would increase by corresponding amounts in the shingling direction, which is also the direction away from the priority servo (servo track 2). Physically, since the lateral distance between the heads $2_1$-$2_4$ is fixed, when the magnetic tape 6 contracts the track pitch of data tracks $24_2$-$24_4$ will be larger compared to the decreased track pitch of data tracks $4_1$-$4_4$.

Other Considerations; Readback

In the example embodiments described above a distortion of the magnetic tape 6 is shown as occurring after writing the initial data tracks $4_1$-$4_4$ of a data band. However, the distortion of the magnetic tape 6 may occur after writing any of the data tracks within the data band, and in some embodiments, the distortion may occur multiple times across the data band. That is, in one embodiment the track pitch of the data tracks may change multiple times across a data band, wherein in one embodiment the varying track pitch across the data band is accounted for when reading the data tracks. In one embodiment, during a write operation a change in the track pitch as described above may be saved and the saved track pitch used during a write operation to read the data tracks.

In one embodiment in order to correctly align the heads with the written data tracks during a read operation, the track pitch when writing the data tracks is saved. For example, the saved track pitch may be used to orient a head bar so that the data heads align with the data tracks. In one embodiment, the distortion state of the magnetic tape (e.g., expanded or contracted) may also be saved in addition to the track pitch when writing a set of data tracks. In this embodiment, the saved track pitch and the saved distortion state may be used to align the data heads to the data tracks during a read operation.

One embodiment is a data storage device configured to access a magnetic tape. The data storage device comprises: a plurality of heads configured to write a plurality of data tracks on the magnetic tape; and control circuitry configured to: (1) use the heads to write a first plurality of data tracks on the magnetic tape; (2) determine a distortion of the first plurality of data tracks after the first plurality of data tracks have been written; and (3) use the heads to shingle write a second plurality of data tracks relative to the first plurality of data tracks based on the determined distortion.

Another embodiment is a data storage device configured to access a magnetic tape. The data storage device comprises: (1) a plurality of heads configured to write a plurality of data tracks on the magnetic tape; and (2) control circuitry configured to: use the heads to write a first plurality of data tracks on the magnetic tape at a first track pitch; and use the heads to shingle write a second plurality of data tracks relative to the first plurality of data tracks at a second track pitch different than the first track pitch to compensate for a distortion of the magnetic tape.

Yet another embodiment is a data storage device configured to access a magnetic tape. The data storage device comprises: (1) a plurality of heads for writing first and second sets of data tracks on the magnetic tape; (2) a means for determining a distortion in the magnetic tape of the first set of data tracks after the first set of data tracks have been written; and (3) a means for controlling the heads to shingle write the second set of data tracks relative to the first set of data tracks based on the determined distortion.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in an SOC. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In addition, any suitable electronic device, such as computing devices, data server devices, media content storage devices, etc. may comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device configured to access a magnetic tape, the data storage device comprising:
   a plurality of heads configured to write a plurality of data tracks on the magnetic tape; and
   control circuitry configured to:
   use the heads to write a first plurality of data tracks on the magnetic tape;
   determine a distortion of the first plurality of data tracks after the first plurality of data tracks have been written; and
   use the heads to shingle write a second plurality of data tracks relative to the first plurality of data tracks based on the determined distortion.

2. The data storage device as recited in claim 1, wherein a first track pitch of the first plurality of data tracks is different than a second track pitch of the second plurality of data tracks.

3. The data storage device as recited in claim 1, wherein the control circuitry is further configured to compensate the determined distortion by designating a priority servo signal from a plurality of servo signals.

4. The data storage device as recited in claim 3, wherein the priority servo signal designation is dependent on a direction of the shingle write of the second plurality of data tracks.

5. The data storage device as recited in claim 3, wherein the priority servo signal designation is dependent on whether the determined distortion is expansion or contraction.

6. The data storage device as recited in claim 3, wherein the control circuitry is further configured to cause the heads to move toward a servo track associated with the priority servo signal in compensating for the determined distortion.

7. The data storage device as recited in claim 1, wherein when control circuitry is further configured to determine the distortion by (1) periodically recording position information along a length of the magnetic tape while writing the first plurality of data tracks, and (2) comparing the recorded position information with position information from processed servo signals while shingle writing the second plurality of data tracks.

8. A data storage device configured to access a magnetic tape, the data storage device comprising:

a plurality of heads configured to write a plurality of data tracks on the magnetic tape; and
control circuitry configured to:
   use the heads to write a first plurality of data tracks on the magnetic tape at a first track pitch;
   measure a distortion of the magnetic tape after writing the first plurality of data tracks; and
   use the heads to shingle write a second plurality of data tracks relative to the first plurality of data tracks at a second track pitch different than the first track pitch to compensate for the measured distortion of the magnetic tape.

9. The data storage device as recited in claim 8, wherein the control circuitry is further configured to compensate for the measured distortion by designating a priority servo signal in processing a plurality of servo signals from reading servo tracks from the magnetic tape.

10. The data storage device as recited in claim 9, wherein the priority servo signal designation is dependent on a direction of the shingle writing of the second plurality of data tracks and whether the measured distortion is expansion or contraction.

11. The data storage device as recited in claim 9, wherein the control circuitry is further configured to cause the heads to move toward a servo track associated with the priority servo signal in compensating for the measured distortion.

12. The data storage device as recited in claim 9, wherein the second plurality of data tracks are shingle written with a shingle overlap that is increasing or decreasing in a direction from a first servo track to a second servo track, wherein the first servo track is a designated priority servo track from which the priority servo signal is read.

13. The data storage device as recited in claim 8, wherein the distortion is caused by the magnetic tape expanding causing a track pitch of the first plurality of data tracks to increase.

14. The data storage device as recited in claim 8, wherein the distortion is caused by the magnetic tape contracting causing a track pitch of the first plurality of data tracks to decrease.

15. The data storage device as recited in claim 8, wherein the second plurality of data tracks are shingle written with a shingle overlap that is increasing or decreasing in a direction from a first servo track to a second servo track.

16. A data storage device configured to access a magnetic tape, the data storage device comprising:
   a plurality of heads for writing first and second sets of data tracks on the magnetic tape;
   a means for determining a distortion in the magnetic tape of a first set of data tracks after the first set of data tracks have been written; and
   a means for controlling the heads to shingle write a second set of data tracks relative to the first set of data tracks based on the determined distortion.

17. The data storage device as recited in claim 16, the means for controlling the heads to shingle write comprises a means to compensate the determined distortion by (1) designating a priority servo signal in processing a plurality of servo signals, and (2) using resultant processed servo signals based on the priority servo signal designation for determining a position of the heads.

18. The data storage device as recited in claim 16, wherein the means for determining the distortion is configured to determine distortion by (1) periodically recording position information along a length of the magnetic tape while writing the first set of data tracks, and (2) comparing the recorded position information with position information from processed servo signals while writing the second set of data tracks.

19. A data storage device configured to access a magnetic tape, the data storage device comprising:
- a plurality of heads configured to write a plurality of data tracks on the magnetic tape; and
- control circuitry configured to:
  - use the heads to write a first plurality of data tracks on the magnetic tape at a first track pitch, wherein the first track pitch is defined by a first distance between adjacent first tracks of the first plurality of data tracks; and
  - use the heads to shingle write a second plurality of data tracks relative to the first plurality of data tracks at a second track pitch different than the first track pitch to compensate for a distortion of the magnetic tape, wherein the second track pitch is defined by a second distance between adjacent second tracks of the second plurality of data tracks.

20. The data storage device as recited in claim 19, wherein the first distance is between upper ends or lower ends of the adjacent first tracks.

* * * * *